(12) United States Patent
Fuleshwar Prasad et al.

(10) Patent No.: US 10,708,871 B2
(45) Date of Patent: Jul. 7, 2020

(54) APPARATUS AND METHOD FOR POWERING NODES OF A WIRELESS NETWORK

(71) Applicant: BlackBerry Limited, Waterloo (CA)

(72) Inventors: Mahendra Fuleshwar Prasad, Waterloo (CA); Ying Tong Man, Waterloo (CA); Jonathan Quinn Brubacher, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/957,777

(22) Filed: Apr. 19, 2018

(65) Prior Publication Data

US 2019/0327692 A1   Oct. 24, 2019

(51) Int. Cl.
*H04W 52/34* (2009.01)
*H04W 52/28* (2009.01)

(52) U.S. Cl.
CPC ......... *H04W 52/34* (2013.01); *H04W 52/28* (2013.01)

(58) Field of Classification Search
CPC ........ H02J 7/02; H02J 7/025; H02J 50/00–90; H04W 52/28; H04W 52/34
See application file for complete search history.

(56) References Cited

U.S. PATENT DOCUMENTS

| 9,190,849 B2* | 11/2015 | Won | G06Q 30/06 |
| 2010/0315045 A1 | 12/2010 | Zeine | |
| 2011/0115432 A1* | 5/2011 | El-Maleh | G06Q 30/0267 |
| | | | 320/108 |
| 2015/0133158 A1* | 5/2015 | Tofighbakhsh | H04W 4/02 |
| | | | 455/456.2 |
| 2016/0099602 A1 | 4/2016 | Leabman et al. | |
| 2017/0338698 A1* | 11/2017 | Zeine | H02J 50/20 |
| 2018/0212474 A1* | 7/2018 | Hosseini | H02J 50/23 |
| 2019/0097328 A1* | 3/2019 | Yong | H01Q 21/245 |

FOREIGN PATENT DOCUMENTS

WO     2017137838 A1    8/2017

OTHER PUBLICATIONS

Abildgren et al., "Indoor Positioning Service, Bluetooth® Service Specification," Bluetooth® Special Interest Group, May 19, 2015, pp. 1-22.
European Patent Application No. 19168912.4, Extended European Search Report dated Sep. 18, 2019.

* cited by examiner

*Primary Examiner* — Raymond S Dean
(74) *Attorney, Agent, or Firm* — Borden Ladner Gervais LLP; Todd Keeler (57) ABSTRACT

An apparatus and method for transmitting power from a primary node to one or more secondary nodes of a wireless network includes, for each of the one or more secondary nodes, associating one of a plurality of directional antenna arrays of the primary node with the secondary node, and transmitting power to the secondary node utilizing the one of the plurality of directional antenna arrays associated with the secondary node.

19 Claims, 4 Drawing Sheets

APPARATUS AND METHOD FOR POWERING NODES OF A WIRELESS NETWORK

FIELD

The present disclosure relates powering nodes of a wireless network.

BACKGROUND

Networks of wireless devices, or wireless nodes, have become more prevalent with the growth of the so called internet of things (IOT). Often the nodes included in such networks are battery powered. As smaller and smaller nodes are desired, the size of the battery, and thus the available power, of the node may also be decreased.

Lengthening the battery life of wireless nodes is a challenge because increasing battery capacity leads to increases in the size and the cost of the wireless nodes, both of which are undesired.

Improvements in powering nodes in a wireless network are desirable.

BRIEF DESCRIPTION OF THE DRAWINGS

Embodiments of the present disclosure will now be described, by way of example only, with reference to the attached Figures.

DETAILED DESCRIPTION

The present disclosure provides an apparatus and method for transmitting power to secondary nodes in a wireless network. According to the present disclosure, a primary node, of a wireless network includes a plurality of directional antenna arrays and is connectable to an external power source. The primary node associates each of the secondary nodes of the wireless networks with at least one of the directional antenna arrays and transmits power to each the secondary nodes using the directional antenna array or arrays associated with that secondary node.

In this way, power may be transmitted to the secondary nodes of the wireless network, which the secondary nodes may utilize to power the second node, or to charge internal batteries, or both, in order to lengthen the battery life of the secondary nodes.

In an embodiment, the present disclosure provides a method of transmitting power by a primary node to one or more secondary nodes of a wireless network that includes, for each of the one or more secondary nodes: associating one of a plurality of directional antenna arrays of the primary node with the secondary node, and transmitting power to the secondary node utilizing the one of the plurality of directional antenna arrays associated with the secondary node.

In an example embodiment, the method includes, for each of the one or more secondary node, determining a direction of the secondary node relative to the primary node, wherein associating one of the plurality of directional antenna arrays with the secondary node comprises associating a directional antenna array of the plurality of antenna arrays having a transmission direction that best matches the determined direction of the secondary node relative to the primary node.

In an example embodiment, determining a direction of the secondary node comprises receiving, at the primary node, a secondary node location from the secondary node, and determining the direction of the secondary node utilizing the secondary node location.

In an example embodiment, determining a direction of the secondary node is based on a map of locations of the one or more secondary nodes and the primary node.

In an example embodiment, associating one of a plurality of directional antennas of the primary node with the secondary node includes for each of the plurality of directional antenna arrays, transmitting power utilizing the directional antenna array, receiving a message from the secondary node indicating a power received at the secondary node from the directional antenna array, and associating the secondary node with the one of the plurality of directional antenna arrays for which secondary node indicated the greatest amount of power was received.

In an example embodiment, transmitting power comprises transmitting power at a subGHz frequency.

In an example embodiment, for at least one of the one or more secondary nodes, associating one of a plurality of directional antenna arrays with the secondary node includes associating two or more of the plurality of directional antenna arrays with the secondary node, and transmitting power to the secondary node includes transmitting power to the secondary node utilizing the two or more of the plurality of directional antenna arrays associated with the secondary node.

In an example embodiment, the two or more of the plurality of directional antenna arrays associated with the secondary node include directional antenna arrays of at least two different frequency bands, and wherein transmitting power utilizing the two or more of the plurality of directional antenna arrays comprises transmitting power at at least two different frequencies.

In an example embodiment, the including determining a time duration for transmitting power to the secondary node and an interval between transmitting power of the time duration based on a profile associated with the secondary node.

In an example embodiment, one or more of the plurality of directional antenna arrays are utilized for data communication between the primary node and the one or more secondary nodes.

In another embodiment, the present disclosure provides an apparatus for transmitting power to one or more secondary nodes of a wireless network that includes a plurality of directional antenna arrays, a processor in communication with the plurality of directional antenna arrays, the processor configured to, for each of the one or more secondary nodes, associate one of the plurality of directional antenna arrays with the secondary node, and transmit power to the secondary node utilizing the one of the plurality of directional antenna arrays associated with the secondary node.

In an example embodiment, the processor is further configured to, for each of the one or more secondary node, determine a direction of the secondary node, wherein associating one of the plurality of directional antenna arrays with the secondary node comprises associating a directional antenna array of the plurality of antenna arrays having a transmission direction that corresponds the determined direction of the secondary node.

In an example embodiment, determining a direction of the secondary node comprises receiving a secondary node location from the secondary node, and determining the direction of the secondary node utilizing the secondary node location.

In an example embodiment, determining a direction of the secondary node is based on a map of locations of the one or more secondary nodes and the apparatus.

In an example embodiment, to associate one of a plurality of directional antennas with the secondary node, the processor is configured to for each of the plurality of directional antenna arrays, transmit power utilizing the directional antenna array, receive a message from the secondary node indicating a power received at the secondary node from the directional antenna array, and associate the secondary node with the one of the plurality of directional antenna arrays for which secondary node indicated the greatest amount of power was received.

In an example embodiment, transmitting power comprises transmitting power at a subGHz frequency.

In an example embodiment, for at least one of the one or more secondary nodes, associating one of a plurality of directional antenna arrays with the secondary node comprises associating two or more of the plurality of directional antenna arrays with the secondary node, and transmitting power to the secondary node comprises transmitting power to the secondary node utilizing the two or more of the plurality of directional antenna arrays associated with the secondary node.

In an example embodiment, the two or more of the plurality of directional antenna arrays associated with the secondary node include directional antenna arrays of at least two different frequency bands, and wherein transmitting power utilizing the two or more of the plurality of directional antenna arrays comprises transmitting power at at least two different frequencies.

In an example embodiment, the processor is further configured to determine a time duration for transmitting power to the secondary node and an interval between transmitting power of the time duration based on a profile associated with the secondary node.

In an example embodiment, one or more of the plurality of directional antenna arrays are utilized for data communication between the apparatus and the one or more secondary nodes.

In another embodiment, the present disclosure provides a non-transitory computer-readable medium having stored thereon computer readable code executable by a processor of a primary node to cause the processor to, for each of the one or more secondary nodes, associate one of a plurality of directional antenna arrays of the primary node with the secondary node, and transmitting power to the secondary node utilizing the one of the plurality of directional antenna arrays associated with the secondary node.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Figure 1:
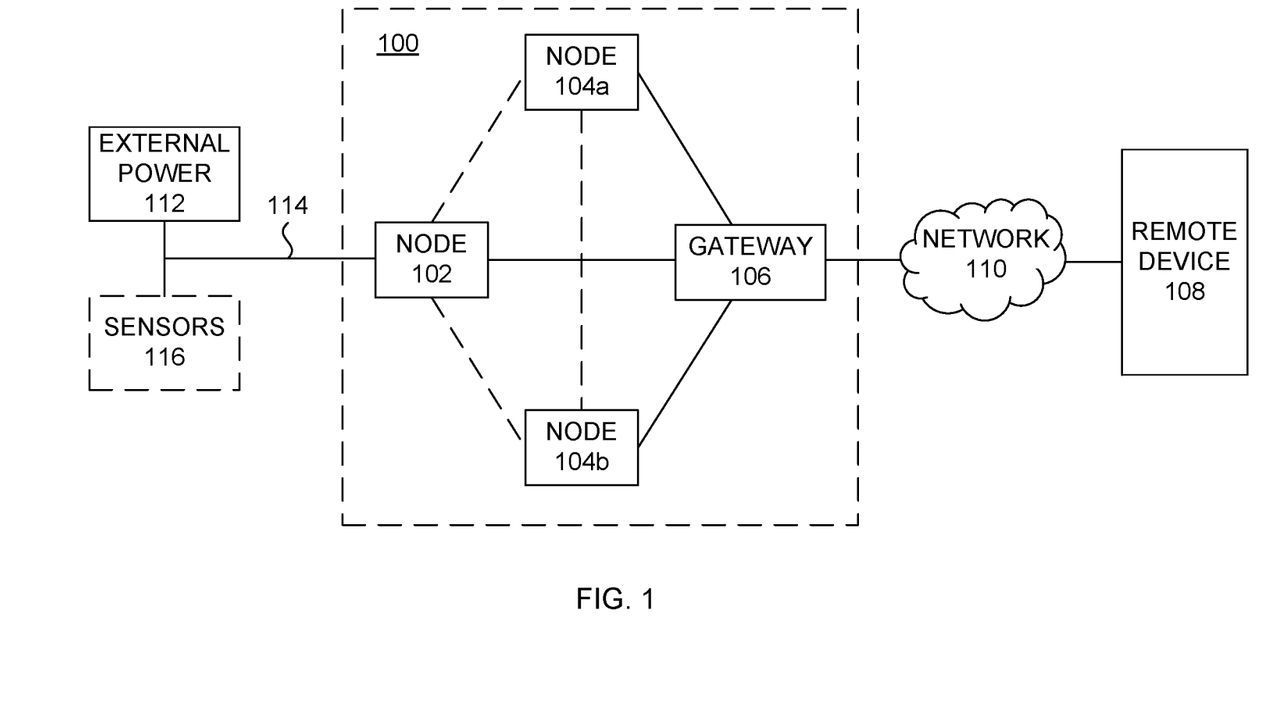
FIG. 1 is a block diagram of an example wireless node network in accordance with the present disclosure.

FIG. 1 is a schematic diagram of an example wireless node network 100. The example wireless network 100 includes three nodes 102, 104a, 104b and a gateway 106. Each node 102, 104a, 104b may establish wireless connections with the gateway 106, as indicated by the solid lines, to facilitate transmitting data to and receiving data from the gateway 106.

Additionally, or alternatively, each node 102, 104a, 104b may establish wireless connections with one or more of the other nodes 102, 104a, 104b of the wireless node network 100, as indicated by the dashed lines, to facilitate transmitting data to and receiving data from the other nodes 102, 104a, 104b, forming what is known as a meshed network. In this example, one or more nodes 102, 104a, 104b may communicate with the gateway 106 via one or more of the other nodes 102, 104a, 104b which act as an intermediary, rather than the one or more nodes 102, 104a, 104b transmitting data to the gateway 106 directly. For example, node 102 may transmit data to the gateway 106 by first transmitting the data to the node 104b, which then transmits that data onto to the gateway 106. Similarly, in this example, the gateway 106 may transmit data to the node 102 by first transmitting that data to the node 104b, which then transmits the data onto the node 102.

Although the example wireless node network 100 shown in FIG. 1 includes three nodes 102, 104a, 104b and one gateway 106, the network 100 include a greater or a fewer number of nodes 102, 104a, 104b and more than one gateway 106.

The gateway 106 may transmit data received from the nodes 102, 104a, 104b to, for example, a remote device 108 via a network 110. The remote device 108 may be, for example, a server or any other electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

The network 108 over which the gateway 106 communicates with the remote device 108 may be any suitable wired or wireless network, or combination of wired and wireless networks including, for example, a local area network (LAN), or a wide area network (WAN), or a combination thereof. Wireless communication between the gateway 106 and the network 110 may utilize any suitable short-range wireless communication protocol, as described above, or any utilize any suitable cellular communication protocol including, for example, CDMA2000, 3GPP GERAN, 3GPP UTRAN, 3GPP E-UTRAN (LTE) or 3GPP 5G.

The nodes 102, 104a, 104b and the gateway 106 may utilize any suitable wireless communication protocol to transmit and receive data with each other. For example, the nodes 102, 104a, 104b and the gateway 106 may utilize a short-range wireless communication protocol such as, for example, Bluetooth®, Bluetooth Low Energy (BLE), IEEE 802.15.4, WiFi®, or Zigbee®, or any combination thereof. In another example, nodes 102, 104a, 104b and the gateway 106 may utilize other suitable radio technologies based on, for example, CDMA2000, 3GPP GERAN, 3GPP UTRAN, 3GPP E-UTRAN (LTE) or 3GPP 5G, or any combination thereof. The nodes 102, 104a, 104b and the gateway 106 may communicate with each other utilizing network-to-device radio links or device-to-device radio links such as 3GPP Proximity-based services (ProSe) making use of a PC5 interface, or a combination of network-to-device and device-to-device radio links.

In the example shown in FIG. 1, the node 102 is connectable with an external power source 112 via a suitable connector 114. The connector 114 may optionally be utilized to connect the node 102 to one or more external sensors 116 in addition to the external power source 112. In the present disclosure, a node that is connected, or connectable, to an external power source, such as node 102 in the example of FIG. 1, may be referred to herein as a "primary node". The other devices of the wireless node network 100 that are not connected to, or connectable to, an external power source 112, such as the nodes 104a, 104b and the gateway 106 in the example of FIG. 1, may be referred to herein as "secondary nodes". The terms "primary" and "secondary" as used herein are intended to distinguish nodes are connected to, or are connectable to, an external power source from nodes that are not connectable to an external power source, and are not intended to be otherwise limiting.

As described in more detail below, the primary node 102 may include a plurality of directional antenna arrays that are utilized to wirelessly transmit power received from, for example, the external power source 112 to the secondary nodes 104a, 104b, and 106. The primary node 102 may associate a secondary node 104a, 104b, 106c with one or more of the directional antenna arrays, and utilize the associated directional antenna array to transmit power to that secondary node.

The nodes 102, 104a, 104b may be any type of wireless device that is suitable for transmitting data to and receives data from other the nodes 102, 104a, 104b and the gateway 106 of the wireless node network 100. In an example, one or more of the nodes 102, 104a, 104b and the gateway 106 may include, for example, sensors that are utilized to collect data. The data collected from sensors at the nodes 102, 104a, 104b may then be transmitted to the gateway 106 such that the wireless node network 100 forms a sensor network. The sensors included in the nodes 102, 104a, 104b may be any suitable sensors. Suitable sensors may include, for example, one or more of a temperature sensor, an accelerometer, a light sensor, a sound sensor, a pressure sensor, a gas sensor, a pressure sensor such as, for example, a tire pressure monitoring sensor (TPMS), a motion sensor, a velocity sensor, a radio frequency identity (RFID) reader, a location sensor utilizing, for example, a global positioning system (GPS), a cargo door open sensor, and so forth, or any combination of sensors such as, for example, a temperature, pressure, humidity (TPH) sensor. The type of sensor(s) included in the nodes 102, 104a, 104b and the gateway 106 may depend on, for example, the specific application in which the wireless node network 100 is utilized. In some examples, the different nodes 102, 104a, 104b of the wireless node network 100 may include different sensors.

In an example, the nodes 102, 104a, 104b and the gateway 106 may include temperature sensors and may be utilized to monitor the temperature of an environment. For example, the nodes 102, 104a, 104b and the gateway 106 of the wireless node network 100 may be installed within a transport trailer to measure the temperature at various locations within the transport trailer and transmit the data via, for example, a cellular network to a remote device 108, such as a server, that monitors the temperature. In this example, the external power source 112 and the optional external sensors 116 may be located within a truck that is transporting the transport trailer. The optional sensors 116 may be sensors included in the truck such as, for example, speed sensors, fuel sensors, and tire pressure sensors.

The connector 114 may be any standard connector that is utilized to connect the trailer to the truck including, for example, a J1939/J1962 connector or a SAE560 connector. For example, power may be supplied to the primary node 102 via the J1939/J1962 connector and a controller area network (CAN) bus of the J1939/J1962 connector may be utilized to exchange information between truck and the primary node 102 such as, for example, data from the optional external sensors 116 or other information related to the truck including the VIN of truck, fuel consumption, speed, and fuel economy. In this way, important truck information may be received at the primary node 102, which may be transmitted to the gateway 106, then to a remove device 108 via the network 110.

Figure 2A:
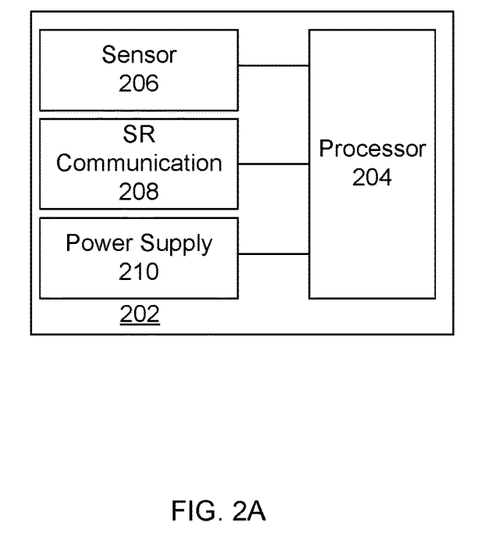
FIG. 2A is a block diagram of an node of a wireless node network in accordance with the present disclosure.

FIG. 2A is schematic diagrams of an example node 202 that may be utilized as, for example, the nodes 104a, 104b the wireless node network 100 shown in FIG. 1. The node 202 includes multiple components, such as a processor 204 that controls the overall operation of the node 202. Sensing functionality is performed by a sensor 206. The sensor 206 may include, for example, one or more of a temperature sensor, an accelerometer, a light sensor, a sound sensor, a pressure sensor, a gas sensor, a TPMS, a motion sensor, an RFID reader, a location sensor, a TPH sensor, a cargo door open sensor, and so forth. In an example, short-range (SR) communication functionality, including receiving and transmitting data with other nodes, or a gateway, or both, is performed by a SR communication subsystem 208. The SR communication subsystem 208 may include a plurality of antennae (not shown) for transmitting and receiving data in different frequency bands. For example, the SR communication subsystem 208 may include one or more antennae that are utilized for transmitting and receiving data in one or more subGHz frequency bands, including 433 MHz, 868 MHz, and 915 MHz, and GHz frequency bands, including the 2.4 GHz frequency band utilized in BLE. The SR communication subsystem 208 may also include one or more power receiving antennae for receiving power transmitted by the primary node. In some examples, the same antennae may be utilized for both transmitting and receiving data and for receiving power. In another example, the SR communication subsystem 208 may include one or more antennae that are dedicated for receiving power, and separate antenna(e) for transmitting and receiving data. The node 202 may also include a power source 210, such as one or more rechargeable batteries, to power the node 202.

Figure 2B:
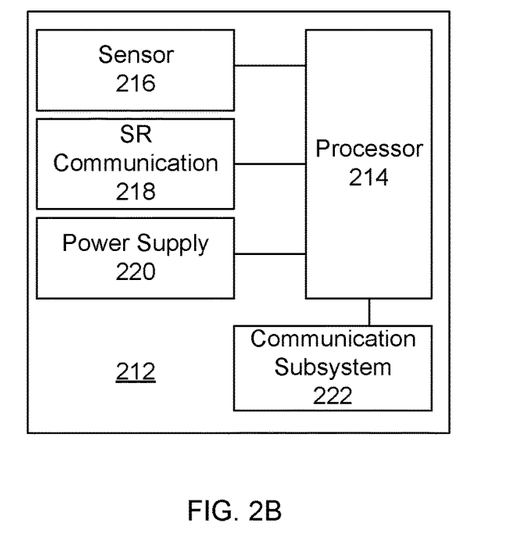
FIG. 2B is a block diagram of an example gateway of a wireless node network in accordance with the present disclosure.

FIG. 2B is a schematic diagram of an example gateway 212 that may be utilized as, for example, the gateway 106 of the wireless network 100 shown in FIG. 1. Similar to the node 202, the gateway 212 includes multiple components, such as a processor 214 that controls the overall operation of the gateway 212. The gateway 212 may include all the functionality of the node 202 and therefore may include a sensor 216 that performs a sensing functionality. The sensor 216 may be any suitable sensor and may be determined by the data that is to be sensed. The sensor 216 may include, for example, one or more of a temperature sensor, an accelerometer, a light sensor, a sound sensor, a pressure sensor, a gas sensor, a TPMS, a motion sensor, an RFID reader, a location sensor, and so forth. SR communication functionality, including receiving data from and transmitting data to nodes, or another gateway, or both, is performed by a SR communication subsystem 218. Similar to the SR communication subsystem 208 included in the node 202, the SR communication subsystem 218 may include one or more antennae that are utilized for transmitting and receiving data in one or more subGHz frequency bands, including 433 MHz, 868 MHz, and 915 MHz, and GHz frequency bands, including the 2.4 GHz frequency band utilized in BLE. The SR communication subsystem 218 may also include one or more power receiving antennae for receiving power transmitted by the primary node. In some examples, the same antennae may be utilized for both transmitting and receiving data and for receiving power. In another example, the SR communication subsystem 218 may include one or more antennae that are dedicated for receiving power, and separate antenna(e) for transmitting and receiving data. A power source 220, such as one or more rechargeable batteries or a port to an external power supply, powers the gateway 212. A communication subsystem 222 is utilized to transmit data to, and receive data from, a remote device, such as for example the remote device 108 described above, via a network, such as for example the network 110 described above.

Figure 2C:
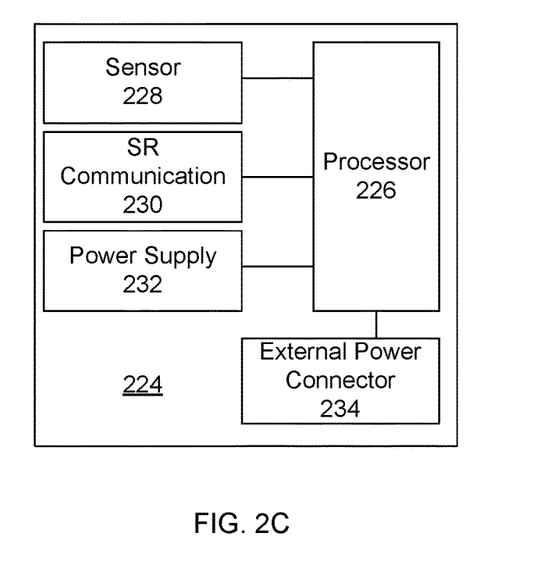
FIG. 2C is a block diagram of an example primary node of a wireless node network in accordance with the present disclosure.

FIG. 2C is a schematic diagram of an example primary node 224 that may be utilized as, for example, the node 102 in the example wireless node network 100 shown in FIG. 1. Similar to the node 202, the primary node 224 includes multiple components, such as a processor 226 that controls the overall operation of the primary node 224. The primary node 224 may include all the functionality of the node 202 and therefore may include a sensor 228 that performs a sensing functionality. The sensor 228 may be any suitable sensor and may be determined by the data that is to be sensed. The sensor 228 may include, for example, one or more of a temperature sensor, an accelerometer, a light sensor, a sound sensor, a pressure sensor, a gas sensor, a TPMS, a motion sensor, an RFID reader, a location sensor, and so forth. The primary node 224 includes a power supply 232 to power the primary node 224. The primary node 224 also includes an external power connector 234 to connect the primary node 224 to an external power source.

As described above, the primary node 224 may also receive additional data or information via the external power connector 234, or by another connector (not shown). In an example, the external power connector 234 may be a standard J1939/J1962 connector utilized to connect the primary node 224 to, for example, a power supply in a truck when the primary node 224 is located within a transport trailer connected to the truck. As described previously, the J1939/J1962 connector may include a CAN bus that may be utilized to provide data from external sensors included in the truck and other information about the truck to the primary node 224. The primary node 224 may then transmit the data and other information to a gateway, such as gateway 106 shown in FIG. 1, which may then transmit the data and other information to a remote device.

The primary node 224 also includes a SR communication subsystem 230. Similar to the SR communication subsystems 208 and 218 of the node 202 and the gateway 212 described above with reference to FIGS. 2A and 2B, respectively, the SR communication subsystem 230 of the primary node 224 may include antennas for utilized for transmitting and receiving data in one or more subGHz frequency bands, including 433 MHz, 868 MHz, and 915 MHz, and GHz frequency bands, including the 2.4 GHz frequency band utilized in BLE. In addition to the antenna(e) for one or more of these frequency bands, the SR communication subsystem 230 may include a plurality of directional antenna arrays utilized for wirelessly transmitting power to secondary nodes of the wireless node network. Alternatively, the antenna(e) for transmitting and receiving data may be arrays of directional antenna arrays such that the wirelessly transmitting power may be performed by the antennas that are also utilized for transmitting and receiving data.

Figure 3:
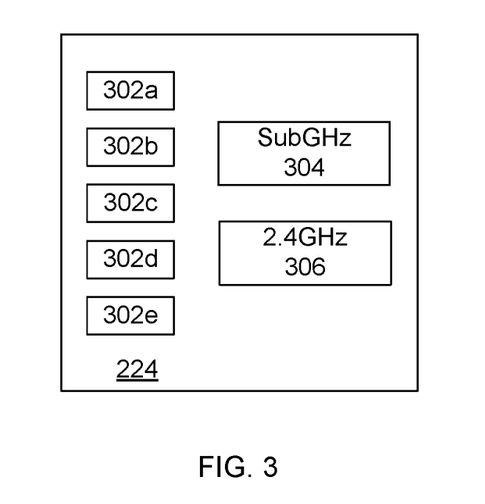
FIG. 3 is a block diagram of an example short-range communication subsystem of the primary node of FIG. 2C in accordance with the present disclosure.

Referring now to FIG. 3, schematic diagram of an example SR communication subsystem 300 including directional antenna arrays is shown. The example SR communication subsystem 300 shown in FIG. 3 may be utilized as the SR communication subsystem 230 of the primary node 224 shown FIG. 2C.

The example SR communication subsystem 300 shown in FIG. 3 includes a plurality of directional antenna arrays 302a to 302e. In general, directional antenna arrays are configured such that the gain of an electromagnetic (EM) signal transmitted by the directional antenna array is directionally dependent. In the present disclosure, the direction in which the gain of an EM signal transmitted by the directional antenna array is maximum is referred to as the "direction of transmission" if the directional antenna array. Each of the plurality of directional antenna arrays 302a to 302e is configured such that the direction of transmission is in one of a plurality of directions relative to the SR communication subsystem 300. Any suitable type of directional antenna array may be utilized to provide the plurality of directional antenna arrays 302a to 302e.

In an example, each of the plurality of antenna arrays 302a to 302e may be configured to transmit EM signals in a different direction. In another example, two or more of the plurality of directional antenna arrays 302a to 302e may be configured to transmit EM signals in the same direction. For example, two of the plurality of directional antenna arrays may be configured to transmit EM signals in a first direction, and another two of the plurality of directional antenna arrays may be configured to transmit EM signals in a second, different direction. Although the SR communication subsystem 300 shown in FIG. 3 includes five directional antenna arrays 302a to 302e, which are configured to transmit EM signals in at most five different directions, in practice more or less than five directional antenna arrays 302a to 302e may be included in the SE communication subsystem 300.

In practice, number of directional antenna arrays 302a to 302e that are included in the SR communication subsystem 300 may be determined based on the number of directions that transmission of EM signals is desired and the number of directional antenna arrays transmitting in each of the directions is desired. Additionally, or alternatively, the total number of directional antenna arrays 302a to 302e, or the number of directional antenna arrays 302a to 302e configured to transmit in a particular direction, or both, that are included in the SR communication subsystem 300 may depend on the number of secondary nodes included in the wireless node network, and the power consumption of those secondary nodes.

In the example shown in FIG. 3, the SR communication subsystem 300 also includes one or more subGHz antennae 304 and one or more 2.4 GHz antennae 306. In this example, the directional antenna arrays 302a to 302e may be utilized solely to transmitting power and additional antennas 304, 306 may be utilized solely for transmitting and receiving data. The subGHz antenna 304 may include one or more antennae for transmitting on one or more subGHz frequency bands such as, for example, one or more of 433 MHz, 868 MHz, and 915 MHz, and GHz frequency bands.

In an alternative embodiment, rather than including a plurality of directional antenna arrays 302a to 302e for power transmission, and separate antennae 304, 306 for data communication, the SR communication subsystem 300 may include only the plurality of directional antenna arrays 302a to 302e that are utilized for both power transmission and data communication, and separate antennae 304, 306 may be omitted.

In this example, the plurality of directional antenna arrays 302a to 302e may include antenna arrays configured to transmit and receive EM signals utilizing one or more of the subGHz and the 2.4 GHz frequency bands. In another example, the directional antenna arrays 302a to 302e may be configured to transmit and receive EM signals utilizing multiple frequency bands. For example, each directional antenna array 302a to 302e may be configured to transmit and receive EM signals utilizing the 868 MHz, 915 MHz, and 2.4 GHz frequency bands.

As disclosed previously, each of the secondary nodes, such as the nodes 104a, 104b and the gateway 106 in the example wireless network 100 shown in FIG. 1, is associated with at least one of the directional antenna arrays 302a to 302e of the primary node 224.

In an example, associating a secondary node of the wireless network with one or more of the directional antenna arrays 302a to 302e of the primary node 224 may be based on a the direction of the secondary node relative to the primary node. In this example, the primary node 224 may associate the secondary node with the one or more directional antenna arrays 302a to 302e that are configured to transmit in a direction that most closely matches the direction to secondary node from the primary node 224. In another example, the primary node 224 may associate the secondary node with one or more of the directional antenna arrays 302a to 302e that have a direction of transmission that differ from the direction to the secondary node by less than a threshold amount, such that more than one directional antenna array may be associated with a secondary node.

The primary node 224 may determine the direction of the secondary node relative to the primary node's 224 location by, for example, receiving a signal from the secondary node in which the secondary node indicates its position.

The secondary node may determine its position, and signal that position to the primary node 224 in any suitable way. The secondary nodes may determine their positions utilizing any suitable methods. In an example, the secondary nodes may store their positions in a memory. The position of a secondary node may be entered into the memory during the installation of the secondary node. The stored position of the secondary nodes may be relative positions on an indoor map of a region in which the wireless node network that includes the primary node 224 and the secondary nodes. In an example, the secondary node may signal its position utilizing the indoor positioning service that is supported by BLE. The secondary node may signal its position in any suitable format which may include, for example, longitude and latitude coordinates, local coordinates in a local coordinate system such as, for example, a local north coordinate and a local east coordinate, floor number, and altitude. The local coordinate system may be defined with respect to an indoor map of the region in which the wireless node network in located.

In another example, the directions to the secondary nodes relative to the primary node's 224 location may be determined based on information stored at the primary node 224. The information may include, for example, a look up table that includes the positions of the secondary nodes. The information may include the positions of the secondary nodes in any suitable format and may include, for example, coordinates in a local coordinate system, or a distance and direction from the primary node 224 to the secondary node. The information may be stored at the primary node during manufacture or after the primary node 224 and the secondary nodes of the wireless network are installed. The information may be transmitted to the primary node 224 from the secondary node, or may be received from another device such as, for example, a remote device such as remote device 108 in the example shown in FIG. 1.

Alternatively, or additionally, the primary node 224 may associate a secondary nodes to one or more directional antenna arrays 302a to 302e based on the strength of the signals from the one or more directional antenna arrays received at the secondary node.

For example, after the primary node 224 and the secondary nodes of a wireless node network are installed, the primary node 224 may sweep transmission through each the directional antenna arrays 302a to 302e and each secondary node measures the strength of the signal from the transmission of each of the directional antenna arrays 302a to 302e. Each secondary node may then transmit the signal strength measurements to the primary node 224 and the primary node 224 then associates each secondary node with one or more directional antenna arrays 302a to 302e based on the received signal strength measurements.

For example, the primary node 224 may associate a secondary node with the directional antenna array 302a to 302e from which that secondary node measured the largest signal strength. In another example, the primary node 224 may associate a secondary node 224 with a predetermined number of directional antenna arrays 302a to 302e having the largest measured signal strengths. In another example, the primary node 224 may associate a secondary node with one or more directional antenna arrays 302a to 302e for which the measured signal strength at the node meets a threshold signal strength. For example, a secondary node will be associated with each directional antenna array 302a to 302e for which the received signal is greater than a minimum power value.

In one example, the secondary nodes may transmit the measured signal strength for each of the directional antenna arrays 302a to 302e. In another example, the secondary nodes may transmit the measured signal strengths only for a predetermined number of directional antenna arrays 302a to 302e having the largest measured signal strengths. In another example, the secondary nodes may transmit the measured signal strengths only for those directional antenna arrays 302a to 302e for which the measured signal strength meets a threshold value. The measured signal strengths may be transmitted by the secondary node as a received signal strength indicator (RSSI) value.

In an another example, the secondary node may transmit indications of the directional antenna arrays 302a to 302e that meet certain criteria based on the measured signal strengths, rather than transmitting the signal strength measurements. For example, the secondary node may transmit an indication of the directional antenna 302a to 302a for which the largest signal strength was measured, or indications of a predetermined number of the directional antenna arrays 302a to 302e for which the measured signal strength was largest, or indications of one or more directional antenna arrays 302a to 302e for which the measured signal strength meets a threshold value.

Figure 4:
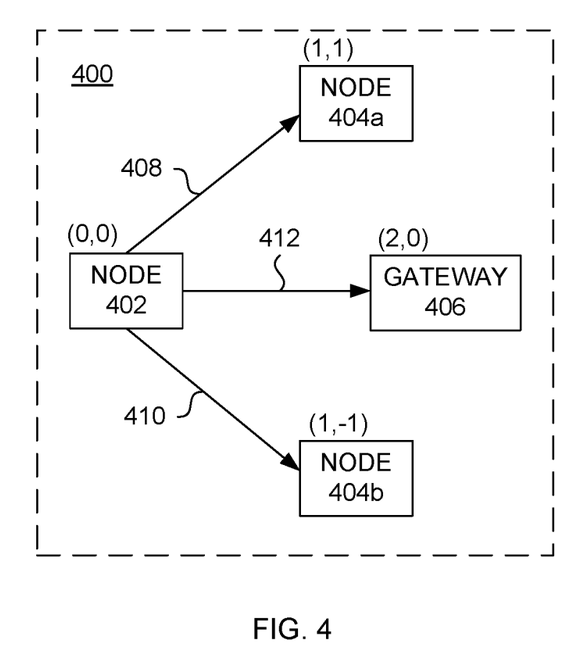
FIG. 4 is a schematic diagram of an example layout of nodes of a wireless node network in accordance with the present disclosure.

FIG. 4 is a schematic diagram of a wireless node network 400 that illustrates an example of determining the directions of the secondary nodes relative to a primary node for an example wireless node network 400 in accordance with the present disclosure. The wireless node network 400 includes a primary node 402, nodes 404*a*, 404*b*, and a gateway 406. The primary node 402 may be similar to the primary node 224, the nodes 404*a*, 404*b* may be similar to node 202, and the gateway 406 may be similar to gateway 212 described previously.

In the example shown in FIG. 4, a primary node 402 is located at a position having coordinate (0,0), the node 404*a* is located at a position having coordinate (1,1), the gateway 406 is located at a position having coordinate (2,0), and the node 404*b* is located at a position having coordinate (1,−1). Although the coordinate system in the example shown in FIG. 4 is defined relative to an origin located at the primary node 402, any suitable coordinate system may be utilized. The coordinates may be in, for example, coordinates in a local coordinate system or may be longitude and latitude coordinates.

The directions from the primary node 402 to the node 404*a*, the node 404*b*, and the gateway 406 are illustrated by the arrows 408, 410, and 412, respectively. The primary node 402 may determine the directions 408, 410, and 412 based on the coordinate positions of the nodes 404*a*, 404*b*, 406, as described above. In an example, each of the nodes 404*a*, 404*b* and the gateway 406 may determine its position by, for example, retrieving a position coordinate from a memory (not shown) or by determining the position utilizing a suitable sensor (not shown). The nodes 404*a*, 404*b* and the gateway 406 may each signal its position coordinates to the primary node 402, which then determines the directions 408, 410, 412 based on the received coordinates.

In another example, the primary node 402 may include a memory (not shown) in which, for example, a lookup table is stored that includes the position coordinates of, or the directions 408, 410, 412 to, the nodes 404*a*, 404*b* and the gateway 406. The lookup table may be stored in the memory of the primary node 402 after the network 400 is installed, or may be stored prior to installation.

Once the directions 408, 410, 412 are determined, the primary node 402 may associate each of the nodes 404*a*, 404*b* and the gateway 406 with one or more directional antenna arrays (not shown) of the primary node 402. For example, the primary node 402 may associate the node 404*a* with the directional antenna array that has a direction of transmission that most closely matches the direction 408. In another example, the primary node 402 may associate the node 404*a* with one or more of the directional antenna arrays that have a direction of transmission that differ from the direction 408 by less than a threshold amount. As described above, the direction of transmission of a directional antenna array is the direction of the maximum gain of a transmitted EM signal. Thus, by associating the node 404*a* with the directional antenna array or arrays having directions of transmission that closely match the direction between the primary node 402 and the node 404*a*, the directional antenna arrays having the highest gain at the node 404*a* are utilized for transmitting power to the node 404*a*.

Similarly for the node 404*b* and the gateway 406, the primary node 402 may associate each of the node 404*b* and the gateway 406 with the directional antenna array that mostly closely matches the directions 410 and 412, respectively, or may associate each of the node 404*b* and the gateway 406 with the directional antenna arrays that differ from the directions 410 and 412, respectively, by less than a threshold amount.

Once the primary node 224 associates each of the secondary nodes with one or more directional antenna arrays 302*a* to 302*e*, the primary node 224 utilizes those associated directional antenna arrays 302*a* to 302*e* to transmit power to the secondary nodes. In general, the primary node 224 may transmit power to a secondary node periodically. For example, the primary node 224 may transmit power to a secondary node for a power transmitting period having a time duration, with power transmitting periods separated by an interval time period. The time durations of the power transmitting period and the interval time period may vary based on different factors.

For example, the primary node 224 may transmit power to the secondary nodes only when the primary node 224 is connected to an external power source. In another example, the primary node 224 may transmit power to a secondary node only when the power remaining in a battery of that secondary node falls below a first predetermined value, and power transmission may continue until the power remaining in the battery increases to a second predetermined value.

Alternatively, or additionally, when the primary node 224 and the secondary nodes are installed within a vehicle, such as a transport trailer, the time durations of the power transmitting period and the interval period may vary depending on a state, or mode, of the secondary nodes such as, for example, whether the nodes are moving which indicates that vehicle is moving, or whether the door of the transport trailer is open.

For example, sensors included within the primary node 224, and the secondary nodes may make measurements and transmit measured data more frequently in the mode in which the vehicle is moving or the vehicle door is closed, and thus consume more power, compared to the mode in which the vehicle is stationary or the door is open. The time durations of the power transmitting period and the interval time period for different modes may be configured different for different modes in order to account for the differences in power consumption and data is transmission frequency.

In an example, the time durations of the power transmitting period and the time interval period utilized for different modes of a secondary node may be included in a profile that is stored in association with the secondary node. The primary node 224 may store a profile associated with each secondary node in, for example, a memory (not shown) of the secondary node. The profile may include, for example, the time durations for the power transmitting period and the time interval period for one or more nodes such as, for example, vehicle moving, vehicle stationary, door open, door closed. The profile may also include the frequency band utilized for power transmission to the secondary node, and the number of antenna included at the secondary node, the frequency bands that the antenna are configured for. The primary node 224 may transmit to a secondary node the profile that is associated with that secondary node such that the secondary node is able to coordinate its awake periods to coincide with the power transmission periods in which the primary node 224 is transmitting power to the secondary node and determine which antenna to receive power on.

Additionally, the time durations of the power transmitting period and the time interval period for each secondary node may be selected such that the primary node 224 is transmitting power to different secondary nodes at different times. For example, in order to provide sufficient power to a secondary node while not exceeding the maximum power that may be transmitted under regulations, the primary node 224 transmit power to a single secondary node at a time. In this example, the primary node 224 may cycle transmitting power to different secondary nodes by offsetting the power transmitting periods of the different secondary nodes.

As described above, each secondary node may be associated with more than one of the directional antenna arrays 302a to 302e of the primary node 224. Multiple directional antenna arrays 302a to 302e may be utilized to increase the amount of power transmitted to the secondary node. For example, communication regulations may limit the total power that may be transmitted in a particular frequency band. For example, some regulations set a maximum power of 14 dBm for transmission for a particular frequency band. More than one frequency band, transmitting power at up to the 14 dBm maximum, may be utilized at the primary node to transmit power, or the number of antenna utilized at the secondary node to power harvest, or both, in order to meet the power requirements of the secondary node while ensuring that regulated power transmission limits are not exceeded.

Alternatively, or additionally, a secondary node may receive power utilizing more than one antenna of the secondary node. For example, the SR communication subsystem 208 of node 202, and the SR communication subsystem 218 of the gateway 212, described previously with reference to FIGS. 2A and 2B may include multiple antennae that may be utilized for receiving power transmitted by a primary node. The antennae utilized by the secondary nodes may be dedicated power receiving antennae, or may be the same antennae utilized for data communication. The multiple antennae utilized for receiving power may be configured for different frequency bands, or may be multiple antennae that are configured for the same frequency band.

Table 1 below provides an example calculation of the power that is received at a secondary node at various distances, measured in meters when the secondary node utilizes one, two, and three antennae for receiving, or harvesting, power transmitted by the primary node. For the purposes of the example calculation, one Watt of power transmitted is from a single directional antenna array of the primary node at a frequency of 915 MHz.

| Distance(m) | Single Antenna energy Harvested(uW) | Two antenna energy Harvested(uW) | Three Antenna energy Harvested(uW) |
| --- | --- | --- | --- |
| 1 | 4380 | 8760 | 13150 |
| 2 | 1230 | 2470 | 3714 |
| 3 | 460 | 920 | 1380 |
| 4 | 268 | 537 | 806 |
| 5 | 178 | 357 | 535 |
| 6 | 112 | 225 | 338 |
| 7 | 82 | 165 | 248 |
| 8 | 43 | 86 | 129 |
| 9 | 34 | 68.1 | 102.2 |
| 10 | 4.8 | 9.7 | 14 |

Based on the above example calculations, it may be possible determine a suitable distance and a number of antennae utilized for power harvesting that meets the power requirements of a particular secondary node. For example, for a secondary node having an known average power consumption of 30 uW, the power requirements of the secondary node can be met if the secondary node is a maximum distance of 9 m away from the primary node, regardless of the number of antennae utilized for power harvesting. In another example, for a secondary node having an average power consumption of 240 uW, the power requirements of the secondary node can be met if the secondary node is a maximum distance of 7 m away from the primary node, if the secondary node harvests power utilizing three antennae.

Figure 5:
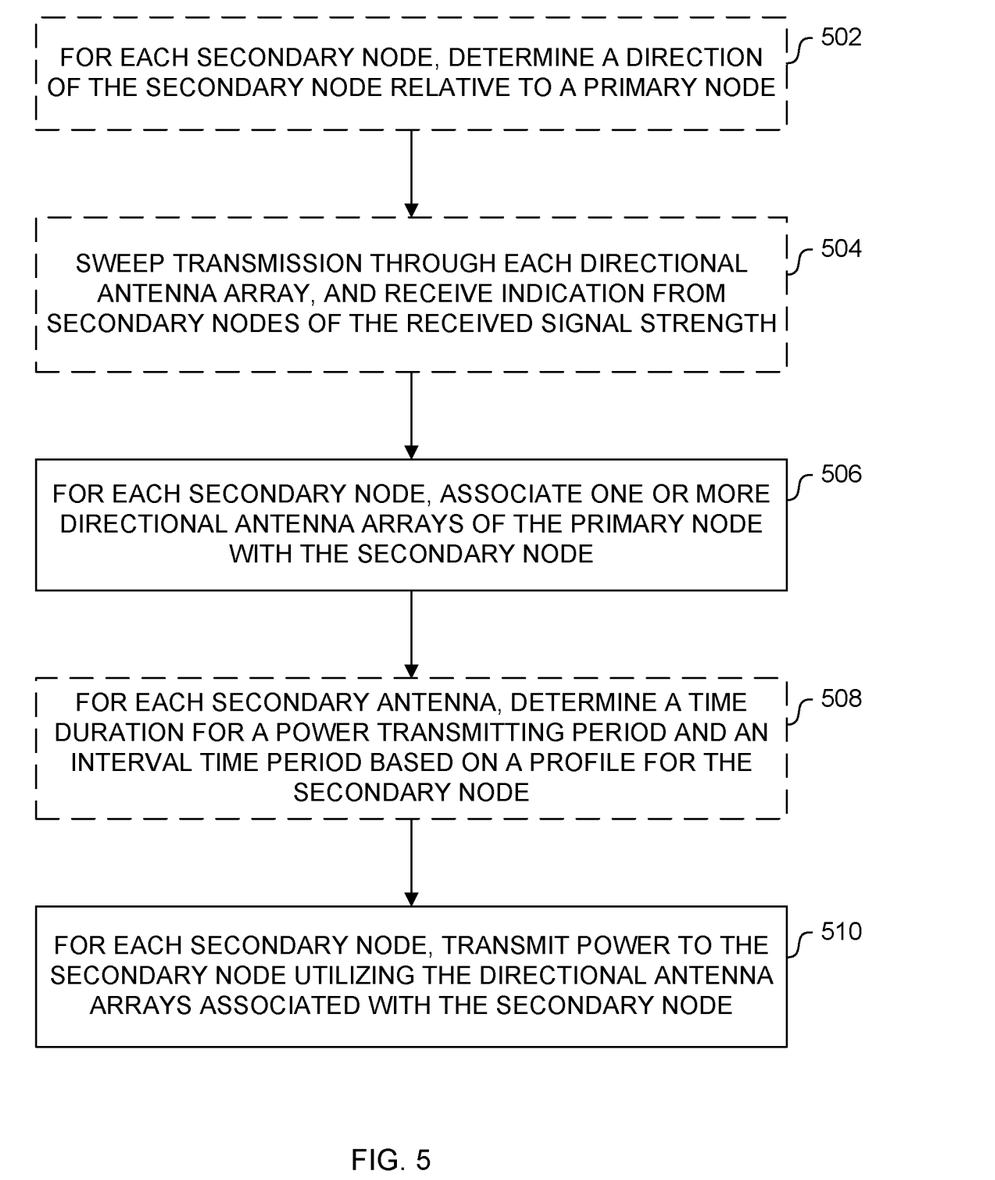
FIG. 5 is a flowchart illustrating a method for wirelessly transmitting power from a primary node to a secondary node in accordance with an embodiment of the present disclosure.

Referring now to FIG. 5, a flow chart illustrating a method for wirelessly transmitting power from a primary node to a secondary node is shown. The method may be carried out by software executed by a processor such as, for example, by the processor 226 of the primary node 224. In some embodiments, a portion of the method may be performed by a processor of a primary node, such as processor 226 of the primary node 224, and another portion of the method may be performed by a processor of a secondary node, such as one or both of the processors 204 and 214 of the node 202 and the gateway 212, respectively. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable storage medium, such as a non-transitory computer-readable medium. The computer-readable code may be incorporated into an operating system or may be incorporated into a stand-alone application.

Optionally at 502, the direction of a secondary node relative to the primary node is determined for each of the secondary nodes of a wireless node network. The determination at 502 may be performed by primary node. Any suitable method for determining the direction may be utilized, as described in more detail previously. As described previously, the primary node may determine the direction of the secondary nodes based on a position indication received from the secondary nodes. In an example, the position indication may be transmitted in accordance with the indoor positioning service provided in the BLE protocol. In another example, the primary node may determine the direction to the secondary nodes based on positions of the secondary nodes that, for example, stored at a memory of the primary node such as, for example, in a lookup table.

Optionally at 504, the primary node may sweep transmission through each of the directional antenna arrays and receive from the secondary nodes an indication of the received signal strength at the secondary nodes. The received indication may be the measured signal strengths for each directional antenna array, or signal strengths may be received from the secondary nodes only for a predetermined number of directional antenna arrays having the largest measured signal strengths, or measured signal strengths may be received only for the directional antenna arrays for which the measured signal strength meets a threshold value. The indication of the measured signal strengths may be RSSI values. In another example, the received indication may be an indication of the directional antenna array for which the received signal was the largest at the secondary node, or indications of a predetermined number of directional antenna arrays for which the received signal was the largest, or indications of the directional antenna arrays for which the received signals meet a threshold value.

At 506, for each of the secondary nodes, the primary node associates one or more directional antenna arrays with the secondary node. If the determination of the directions between the secondary nodes and the primary node is performed at 502, the association at 506 may be performed based on the determined directions. In an example, the association at 506 may be performed such that the directional antenna array that most closely matches the determined direction is associated with the secondary node. In another example, the directional antenna arrays that have a transmission directions that differ from the direction to the secondary node by less than a threshold amount, such that more than one directional antenna array may be associated with a secondary node.

In another example, when the indications are received from the secondary nodes at 504, the association at 506 may be performed based on the received indications. For example, a secondary node may be associated with the directional antenna array from which the received indication indicates the secondary node measured the largest signal strength. In another example, a secondary node may be associated with a predetermined number of directional antenna arrays from which the received indications indicate the secondary node measured largest signal strengths. In another example, a secondary node may be associated with one or more directional antenna arrays from which the received indications indicate the secondary node measured signal strengths that meet a threshold signal strength.

Optionally at 506, the primary node may determine a time duration for a power transmitting period during which the primary node is transmitting power to a secondary node and a time duration for an interval period between power transmitting periods. As disclosed previously, various time durations for the power transmitting period and the interval time period associated with a secondary node may be stored in a profile for that secondary node. The profile may be stored at the primary node and may be shared among the nodes of the network such that the secondary nodes may, for example, coordinate awake periods with the power transmitting periods and may coordinate which antenna of the secondary node may utilize to harvest power.

The time durations for the power transmitting period and the interval time period may different for different modes of the primary node or the secondary node, or both. For example, if the primary node is not connected to an external power source, then no power may be transmitted, i.e., the duration of the power transmission period may be zero. The time durations may depend on, for example, the frequency of the secondary nodes transmitting data such as, for example, data measured by a sensor of the secondary node. In another example in which the primary and secondary sensor are installed within a vehicle, such as a transport trailer, the time durations may depend on whether the vehicle is moving. In this case, the determination at 506 may include determining a mode of the secondary node or the primary node, or both, and determining the time durations for the power transmitting period and the interval period may be based on the determined mode.

Further, the time durations and interval time periods may be determined in order to offset the power transmitting periods of different secondary nodes such that power is transmitted to different secondary nodes at different times in order to, for example, not exceed power maximums set forth in regulations.

At 510, power is transmitted to the secondary node utilizing the one or more of the directional antenna arrays associated with the secondary node. As described previously, power may transmitted by the primary node utilizing multiple directional antenna arrays. In an example, the power may be simultaneously transmitted utilizing different directional antenna arrays in different frequency bands.

Embodiments of the present disclosure provides wirelessly transmitting power to secondary nodes from a primary node that is connected to an external power supply in a wireless node network. By associating each secondary node with one or more directional antenna arrays of the primary node, the efficiency of the wireless power transmission may be increased by transmitting power to a secondary node utilizing directional antenna arrays having a transmission direction that matches a direction between the primary node and the secondary node, or that have the largest received signal strength at the secondary node. The present disclosure provides that power may be transmitted to a secondary node from multiple directional antenna, or may be received at the secondary node utilizing multiple antennae, in order to increase the amount of power received at the secondary node while still complying with regulations governing the amount of power that may be wirelessly transmitted.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of transmitting power by a primary node to one or more secondary nodes of a wireless network, the method comprising:

for each of the one or more secondary nodes:
associating one or more of a plurality of directional antenna arrays of the primary node with the secondary node; and
transmitting power to the secondary node utilizing the one or more of the plurality of directional antenna arrays associated with the secondary node;
wherein associating one or more of a plurality of directional antennas of the primary node with the secondary node comprises:
determining a direction of the secondary node relative to the primary node based on a map of locations of the one or more secondary nodes and the primary node, the map of locations generated utilizing standardized Bluetooth low energy (BLE) indoor positioning services;
selecting a subset of one or more of the plurality of directional antenna arrays having transmission directions that differ from the determined direction by less than a threshold amount;

sweeping transmission through each of the directional antenna arrays of the selected subset such that each directional antenna of the selected subset array transmits a signal in sequence;

receiving a message from the secondary node indicating a signal strength received at the secondary node from the signals transmitted during the sweep of the directional antenna arrays of the selected subset; and associating the secondary node with the one or more of the directional antenna arrays of the selected subset based on the message indicating the signal strength received at the secondary node.

2. The method according to claim 1, further comprising receiving, at the primary node, a secondary node location from each of the one or more secondary nodes, and generating the map of locations based on the received secondary node locations.

3. The method according to claim 1, wherein associating one or more of the directional antenna arrays of the selected subset of the primary node with the secondary node based on the message indicating the signal strength received at the secondary node comprises at least one of:

associating the secondary node with the one of the directional antenna arrays of the selected subset for which secondary node indicated the largest signal strength was received; and associating the secondary node with the one or more of the directional antenna arrays of the selected subset for which secondary node indicated meets a threshold signal strength.

4. The method according to claim 1, wherein transmitting power comprises transmitting power at a subGHz frequency.

5. The method according to claim 1, wherein, for at least one of the one or more secondary nodes, associating one or more of a plurality of directional antenna arrays with the secondary node comprises associating two or more of the plurality of directional antenna arrays with the secondary node, and wherein transmitting power to the secondary node comprises transmitting power to the secondary node utilizing the two or more of the plurality of directional antenna arrays associated with the secondary node.

6. The method according to claim 5, wherein the two or more of the plurality of directional antenna arrays associated with the secondary node include directional antenna arrays of at least two different frequency bands, and wherein transmitting power utilizing the two or more of the plurality of directional antenna arrays comprises transmitting power at at least two different frequencies.

7. The method according to claim 1, further comprising determining a profile associated with the secondary node, the profile including at least one of a frequency band utilized by the secondary node for power transmission, a number of antenna included in the secondary node, or a frequency band that each antenna is configured for, wherein transmitting power to the secondary node comprising transmitting power based on the profile.

8. The method according to claim 1, wherein one or more of the plurality of directional antenna arrays are utilized for data communication between the primary node and the one or more secondary nodes.

9. An apparatus for transmitting power to one or more secondary nodes of a wireless network, the apparatus comprising:

a plurality of directional antenna arrays;

a processor in communication with the plurality of directional antenna arrays, the processor configured to:

for each of the one or more secondary nodes:
associate one or more of the plurality of directional antenna arrays with the secondary node; and
transmit power to the secondary node utilizing the one or more of the plurality of directional antenna arrays associated with the secondary node;

wherein to associate one or more of a plurality of directional antennas of the primary node with the secondary node, the processor is configured to:

determine a direction of the secondary node relative to the primary node based on a map of locations of the one or more secondary nodes and the primary node, the map of locations generated utilizing standardized Bluetooth low energy (BLE) indoor positioning services;

select a subset of one or more of the plurality of directional antenna arrays having transmission directions that differ from the determined direction by less than a threshold amount;

sweep transmission through each of the directional antenna arrays of the selected subset such that each directional antenna of the selected subset array transmits a signal in sequence;

receive a message from the secondary node indicating a signal strength received at the secondary node from signals transmitted during the sweep of the directional antenna arrays of the selected subset; and associate the secondary node with the one or more of the directional antenna arrays of the selected subset based on the message indicating the signal strength received at the secondary node.

10. The apparatus according to claim 9, wherein the processor is further configured to receive a secondary node location from the secondary node, and generate the map of locations based on the received secondary node locations.

11. The apparatus according to claim 9, wherein, to associate one or more of a plurality of directional antennas with the secondary node based on the message indicating the signal strength received at the secondary node, the processor is configured to perform at least one of:

associate the secondary node with the one of the directional antenna arrays of the selected subset for which secondary node indicated the largest signal strength was received; and associate the secondary node with the one or more of the directional antenna arrays of the selected subset for which secondary node indicated meets a threshold power.

12. The apparatus according to claim 9, wherein the processor being configured to transmit power comprises the processor being configured to transmit power at a subGHz frequency.

13. The apparatus according to claim 9, wherein, for at least one of the one or more secondary nodes, the processor being configured to associate one or more of a plurality of directional antenna arrays with the secondary node comprises the processor being configured to associate two or more of the plurality of directional antenna arrays with the secondary node, and wherein the processor being configured to transmit power to the secondary node comprises the processor being configured to transmit power to the secondary node utilizing the two or more of the plurality of directional antenna arrays associated with the secondary node.

14. The apparatus according to claim 13, wherein the two or more of the plurality of directional antenna arrays associated with the secondary node include directional antenna arrays of at least two different frequency bands, and wherein the processor being configured to transmit power utilizing the two or more of the plurality of directional antenna arrays comprises the processor being configured to transmit power at at least two different frequencies.

15. The apparatus according to claim 9, wherein the processor is further configured to determine a profile associated with the secondary node, the profile including at least one of a frequency band utilized by the secondary node for power transmission, a number of antenna included in the secondary node, or a frequency band that each antenna is configured for, and wherein the processor being configured to transmit power to the secondary node comprises the processor being configured to transmit power based on the profile.

16. The apparatus according to claim 9, wherein one or more of the plurality of directional antenna arrays are utilized for data communication between the apparatus and the one or more secondary nodes.

17. A non-transitory computer-readable medium having stored thereon computer readable code executable by a processor of a primary node to cause the processor to:

for each of the one or more secondary nodes:
associate one or more of the plurality of directional antenna arrays with the secondary node; and
transmit power to the secondary node utilizing the one or more of the plurality of directional antenna arrays associated with the secondary node;
wherein to associate one or more of a plurality of directional antennas of the primary node with the secondary node, the computer readable code causes the processor to:

determine a direction of the secondary node relative to the primary node based on a map of locations of the one or more secondary nodes and the primary node, the map of locations generated utilizing standardized Bluetooth low energy (BLE) indoor positioning services;
select a subset of one or more of the plurality of directional antenna arrays having transmission directions that differ from the determined direction by less than a threshold amount;
sweep transmission through each of the directional antenna arrays of the selected subset such that each directional antenna of the selected subset array transmits a signal in sequence;
receive a message from the secondary node indicating a signal strength received at the secondary node from signals transmitted during the sweep of the directional antenna arrays of the selected subset; and
associate the secondary node with the one or more of the directional antenna arrays of the selected subset based on the message indicating the signal strength received at the secondary node.

18. The method according to claim 1, wherein transmitting power to the secondary node depends on a state of the secondary node.

19. The apparatus according to claim 9, wherein the processor being configured to transmit power to the secondary node comprises the processor being configured to transmit power to the secondary node depending on a state of the secondary node.

* * * * *